Feb. 10, 1970     A. W. HAYDON     3,495,113
ELECTRIC ROTATING MACHINERY HAVING ONE STATOR
POLE ON EACH POLE PIECE

Filed Feb. 21, 1967                                                            5 Sheets-Sheet 1

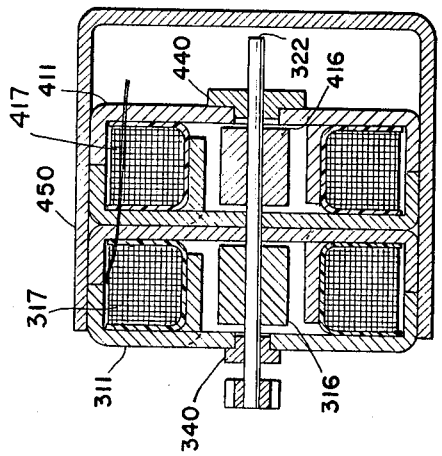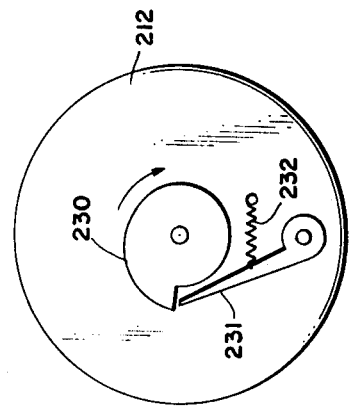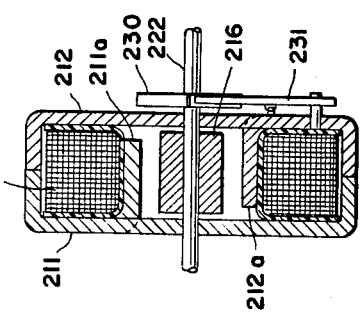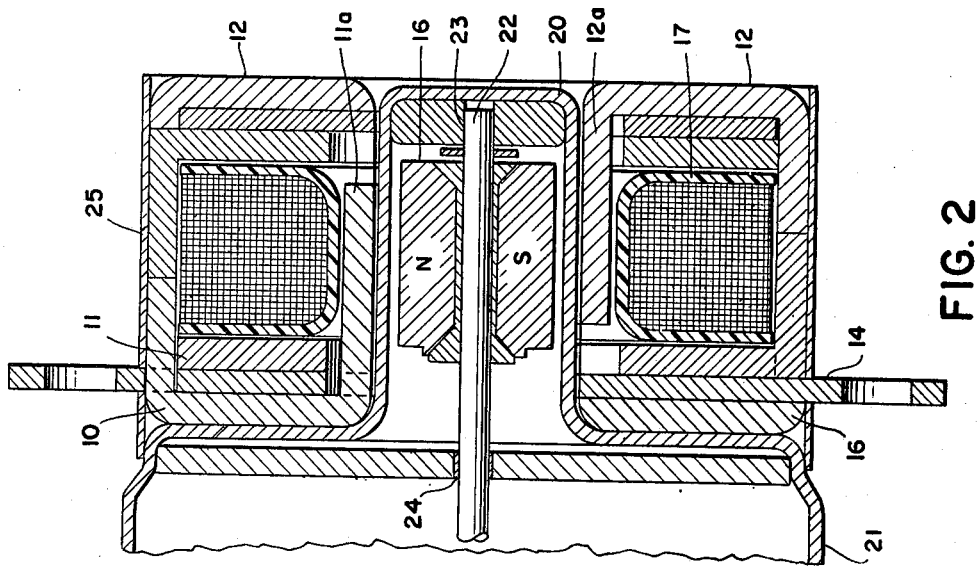

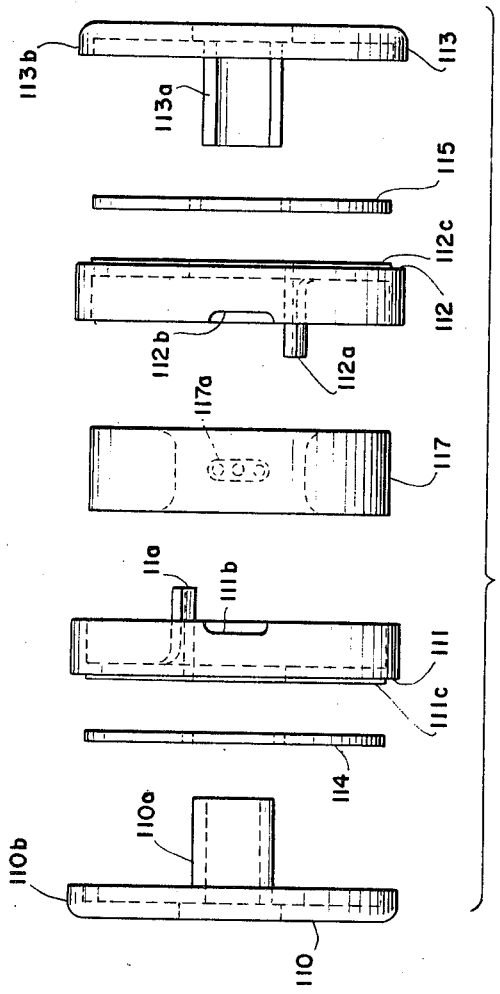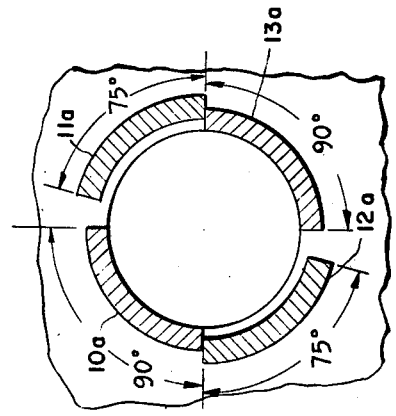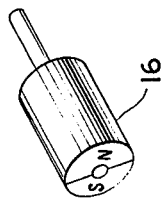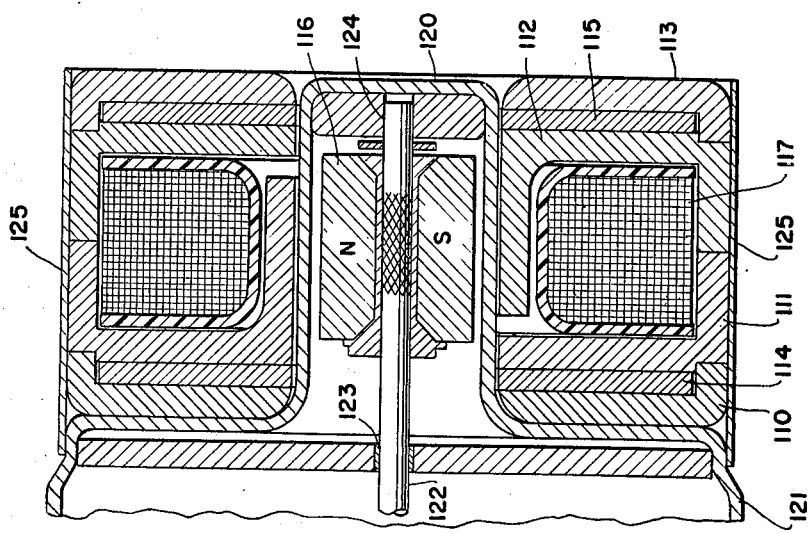

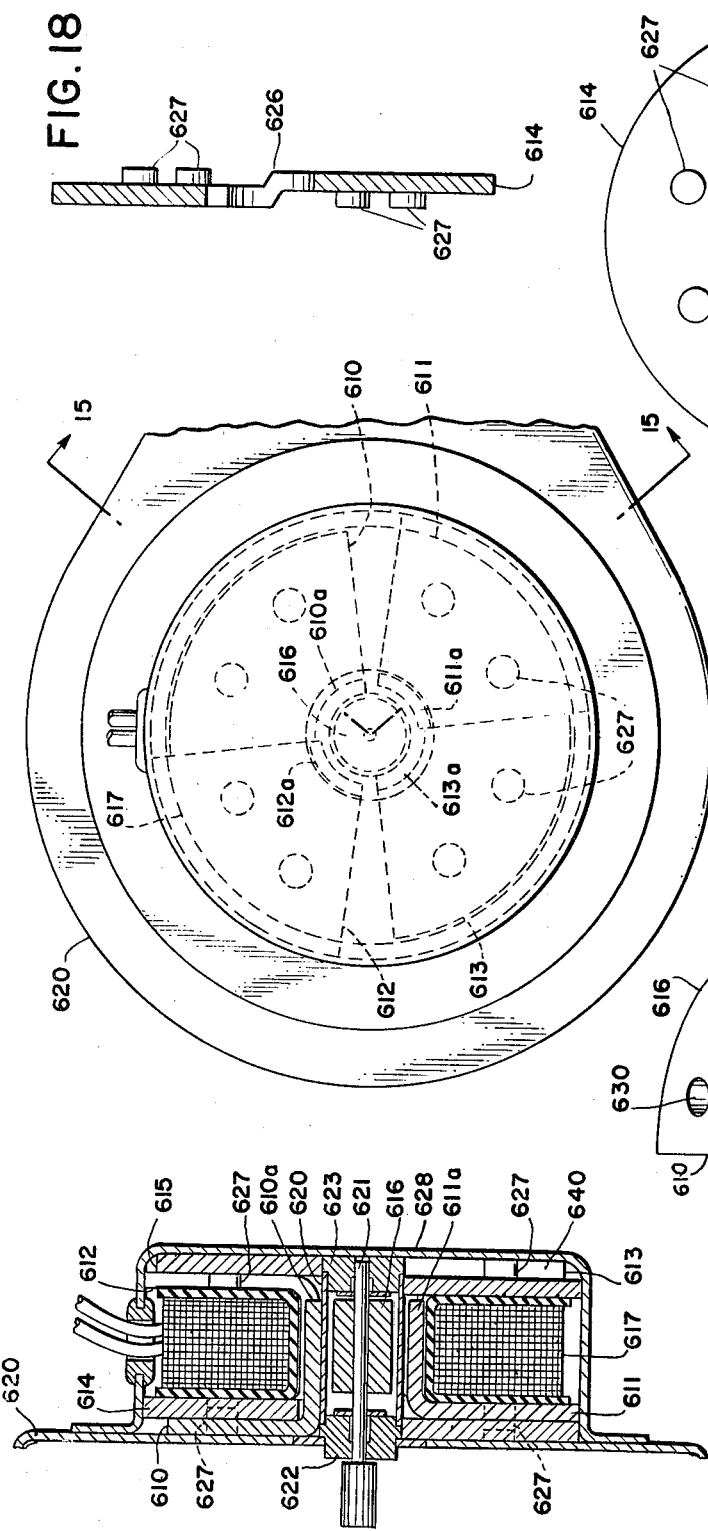
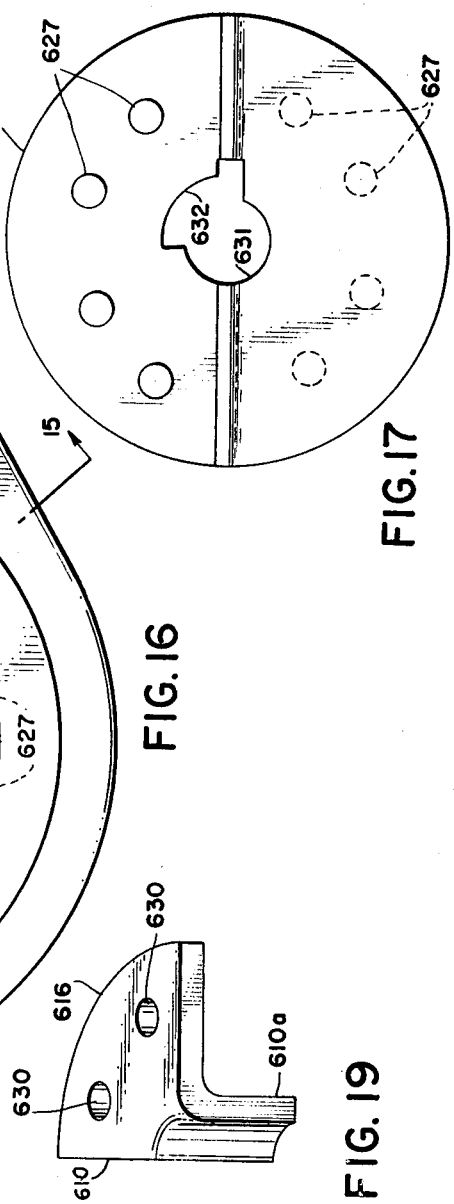

United States Patent Office 3,495,113
Patented Feb. 10, 1970

3,495,113
ELECTRIC ROTATING MACHINERY HAVING ONE STATOR POLE ON EACH POLE PIECE
Arthur W. Haydon, Huntington, Conn., assignor, by mesne assignments, to Tri-Tech, Inc., Waterbury, Conn., a corporation of Connecticut
Filed Feb. 21, 1967, Ser. No. 617,529
Int. Cl. H02k 19/00, 21/04, 21/12
U.S. Cl. 310—164                       23 Claims

ABSTRACT OF THE DISCLOSURE

A small, round electric motor operable as a self starting synchronous motor, a stepping motor or a brushless D.C. motor, the motor comprising a centrally orificed stator and a slender two-pole rotor within the stator orifice in which the stator includes interfitting pole pieces adjacent the rotor and an arrangement for orienting the pole pieces with respect to one another and for holding the parts together.

BACKGROUND OF THE INVENTION

This invention is concerned with small motors which because of their unique construction and arrangement of parts may be made to operate in various modes; for example, as self starting synchronous motors, as pulsed stepping motors, or brushless D.C. motors.

Some motors of related electromagnetic characteristics and functions but of different physical configuration to the motors of this invention are disclosed in copending U.S. patent applications Ser. Nos. 549,698 and 595,286, respectively filed on May 12, 1966, and Oct. 14, 1966, by Arthur W. Haydon, Edward Herbert and William D. Riggs. Application Ser. No. 595,286 issued Feb. 20, 1968, as U.S. Patent 3,370,189.

Motors of the kind herein contemplated are round or annular and may comprise a cylindrical, non-salient pole rotor of a magnetic ceramic material, a stator including several interfitting parts of magnetic material, an annular coil surrounding pole piece portions of the stator, conductive non-magnetic shading members associated with certain pole piece portions where required, and means for securing the stator parts together.

In motors of this general class, it generally is desirable to provide both a self-starting characteristic and a unidirectional characteristic. The provision of a motor which is quickly and reliably self-starting is particularly advantageous for intermittently operable timing applications, for example, and in some cases the motor should reach synchronius speed within the first cycle of the applied wave form. Although the unidirectional characacteristic may be achieved through the use of various mechanical "no-back" devices, such devices add to the cost of the motor and exhibit other disadvantages which detract from the motor's ability to start substantially instantaneously in a given direction. Accordingly, attempts have been made to utilize shading rings, attenuated rotor poles or other devices which affect the magnetic characteristics of the motor in an effort to insure starting in the prescribed direction. However, such prior attempts have not been entirely successful among other reasons because of unavoidable variations in the applied voltage and in the direction of current flow at the instant of circuit closure. Particularly in cases in which the first half cycle or fraction thereof happens to be of incorrect polarity, the motor exhibits a tendency to overcome the influence of the shading rings, attenuated poles or other unidirectional devices and to start in the wrong direction.

Because these motors comprise fairly small parts, another disadvantage has been that prior motors often were difficult to assemble so that the parts, particularly the pole pieces, were correstly spaced and oriented. In order to minimize such a difficulty, the stator parts in certain embodiments of the present motors advantageously have interfitting portions to aid in their alignment during assembly and to serve as part of the housing of the motor. This feature will be described and explained in greater detail in due course.

Small motors of this kind are intended to operate on from a few watts to fractions of a watt of power and desirably with a relatively high torque. For example, the present motors may have with suitable reduction gearing an output of 70 inch-ounces at 1 r.p.m. for one-half watt input power.

SUMMARY

It is, accordingly, an object of this invention to improve the operating characteristics, performance, and structure of small motors of the kind so far discussed.

In accordance with a particular feature of this invention, there is provided an electric motor or other electric rotating machine which utilizes several of the principles of operation of machines in accordance with the copending applications referred to above but which is of round configuration.

In accordance with another feature of several important embodiments of the invention, the rotor of the motor is fabricated from a ceramic material having high coercivity, low permeability and low density and comprises an elongated cylinder including a single pair of non-salient permanently magnetized poles. The rotor is designed in accordance with a specific length-to-diameter ratio. By making this ratio at least about 1.25 to 1, the inertia of the rotor is reduced to a point at which exceedingly high torque is produced even for rotors of extremely small size. Perhaps of even greater significance is that a rotor meeting these requirements, when used with the unique stator structure of the present motor, starts substantially instantaneously and reaches synchronus speed, illustratively 3600 revolutions per minute, within the first cycle of the applied wave form. If the applied wave is of correct polarity, synchronous speed is achieved within the first half cycle. The low inertia of the rotor also enhances its unidirectional characteristics, and the rotor invariably starts in the same direction irrespective of the polarity of the applies wave and even in cases in which the voltage of the wave exceeds the rated voltage of the motor.

A further particular feature of certain embodiments of this invention resides in the use of interfitting magnetic stator parts to serve as assembling guides and in some cases to form part of the housing of a motor.

In order to improve the structure and to minimize the number of parts in the motor assembly, the pole shading members may be in the form of discs fitting within portions of the stator and may be made with ears which project externally of t he housing to serve as mounting members.

Since motors of this kind are usually associated with adjuncts such as, for example, reduction gearing, the structure is improved by mounting the rotor on a shaft projecting from the adjunct housing and mounted within an extension of such housing. The rotor may thus be sealed, have bearings at either end and be insertable into the stator from either side.

BRIEF DESCRIPTION OF THE DRAWINGS

Other and further objects and features of this invention will appear more fully and clearly from the ensuing description of examplary embodiments thereof considered in connection with the appended drawings in which:

FIGURE 2 is a diametric section of the parts of FIGURE 1 when assembled, together with certain cooperating structure;

FIGURE 5 is a section similar to FIGURE 2 but showing another embodiment of the invention, together with certain cooperating structure;

FIGURE 6 is an exploded view of the stator alone of FIGURE 5 without the field coil;

FIGURE 7 is a perspective view of the rotor with indications to show the location of the permanently magnetized sections;

FIGURE 8 is a partially schematic sectional view showing the arrangement of the stator poles;

FIGURE 9 is a perspective view of the motor of FIGURE 6 to show the holding band and to indicate how it is applied;

FIGURE 10 is a sectional view of another motor embodying this invention;

FIGURE 11 is an end view of the motor of FIGURE 10;

FIGURE 12 is a sectional view of another motor comprising an embodiment of this invention;

FIGURE 15 is a sectional view taken along the line 15—15 in FIGURE 16 showing a further motor in accordance with the invention;

FIGURE 16 is a top plan view of the motor shown in FIGURE 15;

FIGURE 17 is a plan view of one of the shading rings for the motor of FIGURE 15;

FIGURE 18 is a diametric sectional view of the shading ring shown in FIGURE 17; and, FIGURE 19 is a perspective view of one of the stator poles for the motor of FIGURE 15.

DESCRIPTION OF PREFERRED EMBODIMENTS

Figure 1:
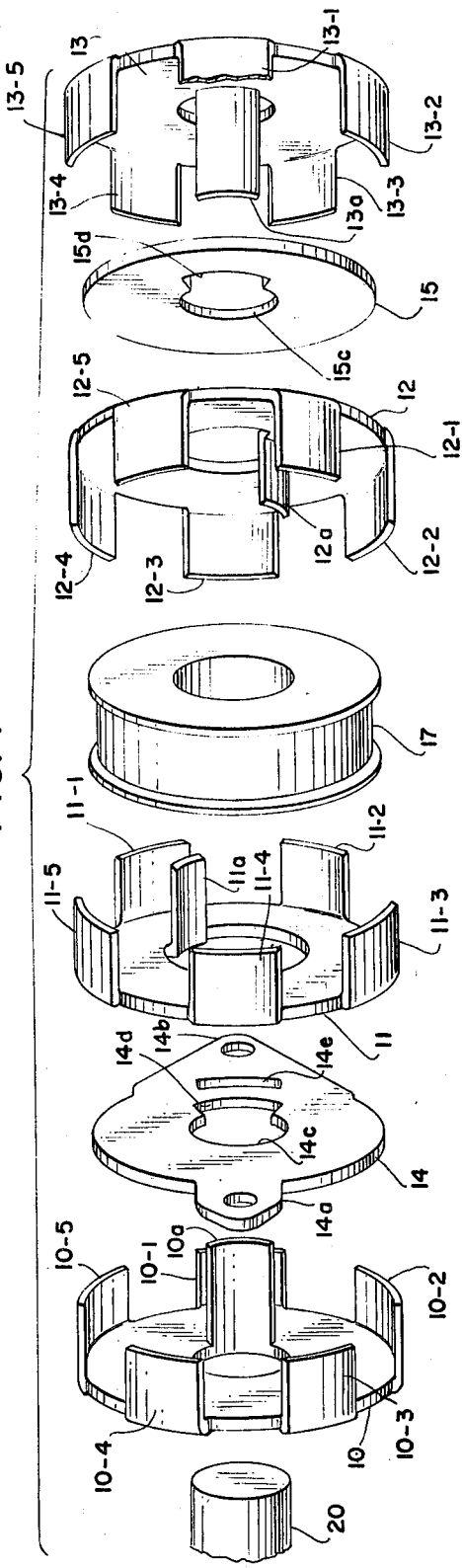
FIGURE 1 is an exploded view in perspective of a motor comprising one embodiment of this invention.
Figure 4:
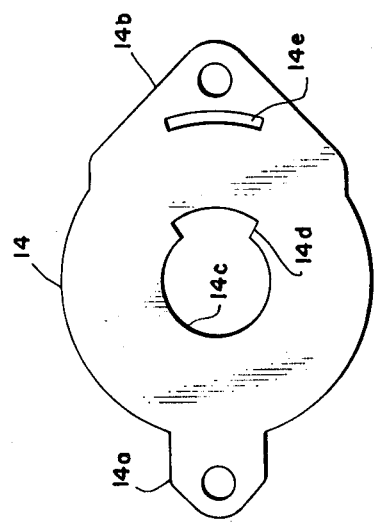
FIGURE 4 is a plan view of a shading ring having mounting ears thereon.

The exploded view of FIGURE 1 shows the parts of the stator structure for the motor with a portion 20 of the adjunct housing containing the rotor. The motor includes stator pole piece members 10, 11, 12 and 13, each comprising a centrally orificed disc and a stator pole extending perpendicularly from the edge of a portion of the orifice. These stator poles are designated respectively as 10a, 11a, 12a and 13a.

Figure 3:
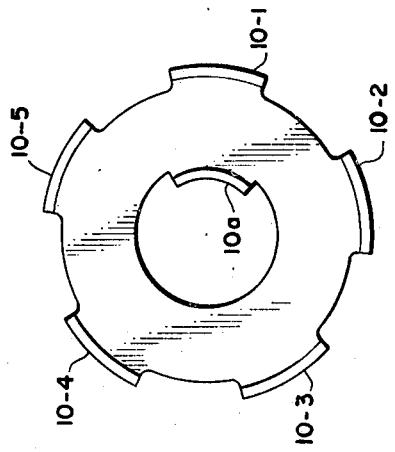
FIGURE 3 is a plan view of one element of the stator.

Each disc, as illustrated for the disc 10 in FIGURE 3, has an interrupted flange comprising five legs 10–1 to 10–5 inclusive equally spaced around its periphery. The remaining discs have their legs similarly designated, namely 11–1, 12–1, etc. As indicated in FIGURE 1, two discs 10 and 11, forming a half section, face one way, and two discs 12 and 13 face the other, so that the half sections face toward each other. The pole pieces and legs are oriented so that the legs interfit in each half section and the half sections intermesh. The legs thus provide return paths for the flux. These members may be of cold rolled steel or other suitable material, for example, magnetic material such as pressed powdered iron. As will appear more clearly in a subsequent description of the assembly of the stator, the interfitting of the legs of adjacent stator discs assures proper peripheral orientation of the poles during assembly.

Two shading rings 14 and 15 are associated with the discs 10 and 13, respectively. Each of the rings 14 and 15 is essentially a disc of copper, aluminum, silver or other suitable conductive but essentially non-magnetic material. The ring 14 is clamped between the pole piece discs 10 and 11, while the ring 15 is clamped between the pole piece discs 12 and 13. For use in the embodiment illustrated in FIGURES 1–4, the ring 14 has oppositely disposed mounting tabs or ears 14a and 14b. The tab 14a is of a width to fit snugly between two stator legs such as 10–3 and 10–4. The tab 14b is wider at its junction with the circle of the shading ring and is slotted at 14e to take one of the flange legs, in this case 10–1. The other shading ring may be similarly formed and fitted if other mounting tabs are required, although in the illustrated embodiment the ring 15 omits the tabs and is of circular configuration. The rings 14 and 15 are respectively provided with slots 14d and 15d at the rims of their central orifices to receive the poles 10a and 13a.

The motor additionally includes a rotor 16 (FIGURE 2) and a field coil 17 which is nested between the stator discs 11 and 12. The rotor 16 is encased in a projection 20 of the adjunct housing 21 and is supported by a shaft 22 mounted in spaced bearings 23 and 24. The projection 20 is removably inserted in the cylindrical orifice bounded by the assembled stator discs. The bearing 23 may be lubricated by a suitable capillary shim (not visible in FIGURE 2) which extends from the interior of the housing 21 along the rotor to the protruding end of the projection 20. The lubricating oil normally provided in the housing for the gear train and the bearing 24 of the motor is carried by the shim to the bearing 23.

A description of the assembly process may aid in a better understanding of the structure. The shading ring 14 is inserted within the flanged disc 10 with the leg 10–1 extending through the mating slot 14e and the tab 14a between the legs 10–3 and 10–4. The disc 11 is then placed over the ring 14 with its legs 11–1, etc., fitted between the legs 10–1 and 10–5, etc., of the disc 10, thus forming a substantially continuous flange. The legs are all of the same length so the legs on the disc 11 will project beyond the legs on the disc 10 a distance approximately equal to the combined thicknesses of the disc 10 and the ring 14. The poles 10a and 11a are of different length so that stacking renders their extremities substantially even.

When the legs on the shaded pole piece 10 and the unshaded pole piece 11 are interfitted, the poles 10a and 11a are spaced apart by an angle which illustratively is fifteen degrees. The pole pieces 12 and 13 and the shading ring 15 may be similarly assembled into another half section with the poles 12a and 13a also spaced apart by a fifteen degree angle. The coil 17 is placed within the flanges of the two groups of pole pieces to complete the assembly of the stator.

The ends of the legs of each pole piece group being alternately long and short permits intermeshing of the two halves. The legs of the pole piece 10, being short, fit against the corresponding legs of the pole piece 12, while the legs of the pole piece 11 fit against the legs of the pole piece 13.

The relative angular extent and the spacing of each leg and stator pole of the pole pieces are such that when assembled in interfitting relation the corresponding poles are opposite each other and properly oriented. Furthermore, the angular extent of each pole is such that the shaded pole in one pole piece group is in contact with the unshaded pole in the opposite group. As best shown in FIGURE 8, this may be done by making the shaded poles 10a and 13a of ninety degree angular extent and the unshaded poles 11a and 12a of seventy-five degree angular extent. With this arrangement, the spacing between the shaded and unshaded poles in the same group, that is, the poles which are of like polarity, is fifteen degrees. The peripheral orientation of the poles is such that the shaded poles are opposite each other and the unshaded poles are also opposite each other.

As best shown in FIG. 2, the stator structure for the motor is surrounded by a band 25 which serves to hold the interleaved flanges of the pole pieces 10, 11, 12 and 13 together. The band 25 preferably is fabricated from an aluminum or soft steel tape which carries appropriate indicia identifying the manufacturer of the motor and giving its voltage and current rating, for example. In some cases the band 25 may be omitted, and a close fitting housing (not illustrated in FIG. 2) may be provided to hold the parts together. For motors which utilize electronic components, the components may be enclosed in a portion of the housing.

The ability of the motor to start in response to an applied voltage is determined by the position at which the rotor stops upon the preceding deenergization of the field coil. In order to make the rotor stop in essentially the same position each time, the air gaps, namely, the pole face to rotor spacings, are different for the shaded poles than for the unshaded poles. This is accomplished as illustrated in FIGURE 8 by locating the shaded poles 10a and 13a at a lesser distance from the axis of the rotor than the unshaded poles 11a and 12a. The difference in distance advantageously may be half the thickness of the stator material. Because the rotor is of uniform diameter and is centered in the stator structure, the shaded pole gaps are less than the unshaded pole gaps. Thus, the distortion of the flux pattern and the reduction in gap reluctance causes the rotor to stop with its poles opposite the shaded poles of the stator. This positions the rotor in the most advantageous position for starting. When current is applied to the field coil, the initial flux build-up occurs in the unshaded poles, and since the rotor is in line with the shaded poles there is produced a strong starting impulse. In the absence of the shaded poles, the rotor might start in either direction, depending upon the polarity of the first half cycle. However, when the flux builds up in the shaded poles the rotor is pulled back if it initially started the wrong way and begins rotating in the correct direction.

The rotor 16 comprises a long cylinder of ceramic magnetic material which is magnetized permanently with opposite north and south poles, as indicated by N and S in FIGURE 7. A relatively "hard" material magnetically is used so as to have high coercivity, low permeability, a high magnetic energy product and a low specific gravity. Representative examples of such materials are Ceramagnet A, A19 and A70 manufactured by Stackpole Carbon Company, Electronic Components Division, St. Marys, Pa., and Indox I and Indox V manufactured by Indiana General Corporation, Valparaiso, Ind. These are of barium ferrite having a composition $BaFe_{12}O_{19}$. Another suitable material is Plastiform available from the Leyman Corporation, Cincinnati, Ohio. The rotor also may be fabricated from a 77% platinum 23% cobalt material made by the Hamilton Watch Company of Lancaster, Pa. This latter material has a residual induction of 6,400 gauss, a coercive force of 4300 oersteds and a maximum energy product of $9.0 \times 16^6$ gauss-oersteds.

The rotor 16 is provided with an axial hole into which the shaft 22 may be secured as by cementing, moulding or other suitable techniques. In some cases, particularly where Plastiform is used as the rotor material, a series of comparatively thin washers of the material are placed in stacked relationship with each other and are adhesively held together to form the rotor. In other preferred embodiments, the Plastiform material may be extruded in tubular form, cut to length and pressed on the shaft.

The use of a long rotor increases the torque available to operate the motor. A relatively high torque is produced when the ratio of rotor length to diameter is within the range of from about 1.25 to 1 to about 2 to 1. It appears that a ratio of 1.5 to 1 is particularly suitable. The net usable torque falls off markedly when this ratio approaches 1 to 1. In addition, by maintaining the ratio at least about 1.25 to 1 the low inertia of the rotor enables substantially instantaneous starting and stopping. This latter feature is particularly advantageous in cases in which the motor is used for intermittent timing operations or for other applications where it is desired to avoid the introduction of a cumulative error in the position of the rotor shaft after repeated starts and stops.

Another embodiment of this invention is disclosed in section in FIGURE 5. The stator pole pieces 110, 111, 112 and 113 are in the form of flanged discs and are shown in their correct relative positions in the exploded view of FIGURE 6. The magnetic members may be stamped from cold rolled steel of suitable thickness or may be made of powdered iron. In a particular example the magnetic material may be .045 inch in thickness for discs about one inch in diameter. Two of the discs 110 and 113 are identical, being centrally orificed and having respective stator poles 110a and 113a projecting at right angles from the peripheries of the orifices. The discs 110 and 113 also include cylindrical flanges 110b and 113b, respectively, which are integrally formed with the circular portions of the discs.

Within the flanges 110b and 113b, respectively, of each of the discs 110 and 113 are the shading rings 114 and 115. The poles 110a and 113a thus serve as the shaded poles of the motor. Although the rings 114 and 115 are illustrated in FIGURES 5 and 6 without mounting ears, such ears may be supplied if required. In this instance, the opposite ears would be the same, like the small ears 14a in FIGURE 4. In order to allow the ears to project, the flanges 110b and 113b would be notched to receive them.

The stator discs 111 and 112 have somewhat deeper flanges than those of the discs 110 and 113 to accommodate the field coil 117. Reduced portions 111c and 112c of the discs 111 and 112 fit respectively within the flanges 110b and 113b. The coil 117 has a projecting fitting 117a by way of which electrical connections may be made, and the discs 111 and 112 have their flanges notched, as at 111b and 112b, to accommodate this fitting.

The parts of the stator are assembled with the rotor 116 (FIGURE 5) which is housed in the closed ended, cylindrical projection 120 of the adjacent gear box or case 121. It will be noted that the rotor shaft 122 is mounted in the spaced bearings 123 and 124, thereby improving its stability. Although for this reason the use of the bearing 124 as well as the bearing 123 is particularly advantageous, in some embodiments the rotor shaft also is supported within the gear box, that is, to the left of the bearing 123 as viewed in FIGURE 5, with the result that the bearing 124 is not needed.

As best shown in FIGURE 9, the gear box 121 and the flanges of the stator discs 110, 111, 112 and 113, are held together by a band 125. This band advantageously comprises a metallic tape which is adhesively secured in place.

Each of the coils 17 and 117 for the embodiments of the invention described thus far include two input leads which are supplied with A.C. voltage from a standard power source. In other embodiments, the coils may be provided with a center tap and supplied with D.C. pulses of alternate polarity, thus enabling operation as a three wire stepper motor of the type described in the copending patent applications referred to above, for example. To increase the inductance of the magnetic circuit for the motors while avoiding saturation of the pole pieces, the coils may be provided with steel bands or split iron rings which are coated with a suitable insulating varnish. Another alternative might be to coat the coils with insulating varnish which has been impregnated with a sufficient quantity of powdered iron or other ferro-magnetic material.

The motor illustrated in FIGURES 10 and 11 is of a structure similar to that of the other motors herein described but comprises a stator in which the shaded poles are omitted, there being only a single pair of unshaded pole pieces 211 and 212. These pole pieces are opposed and enclose a rotor 216 of magnetic material having a single pair of non-salient poles. The pole pieces 211 and 212 are in the form of flanged discs and are provided with inwardly extending poles 211a and 212a, respectively. The pole pieces are surrounded by a field coil 217. The rotor 216 is mounted on a shaft 222 which bears a stepped cam 230 cooperating with a spring biased pawl or detent 231. The pawl 231 is mounted on the motor housing (stator disc 212) and is biased toward the cam 230 by the spring 232, thus forming a one-way rotation or mechanical "no back" device. The stator pole pieces of the motor may each be 90° or more in peripheral extent. This machine with the mechanical direction inhibitor or "no back" device serves as a synchronous inductor motor. To further improve the starting characteristics of the motor, the pole pieces 211 and 212 may be positioned so that their respective poles 211a and 212a lie in a 120° angular relationship with each other, thus producing rotary oscillation upon energization of the field coil to assist starting.

The motor of FIGURE 12 may serve as a step servomotor, a two-phase synchronous inductor motor or a brushless D.C. motor, when used with means for supplying power of suitable characteristics. For example, if either of the two field coils 317 or 417 of the motor is connected in series with a capacitor, a two-phase synchronous inductor motor results which is reversible by switching the capacitor so that it is in series with the other field coil. The motor comprises two identical field structures, 311 and 411, which are each similar to that of the motor shown in FIGURES 10 and 11, except that no mechanical "no back" devices are employed. The structures are mounted side by side with a rotor for each field portion, the rotors being identified at 316 and 416. Alternatively, a single rotor may be provided which cooperates with both of the stator structures. The rotor shaft 322 is mounted in bearings 340 and 440 secured to opposite sides of the stator assembly.

A cup-shaped casing 450 is affixed to the stator assembly and serves to enclose various ancillaries such as the capacitor for a two-phase inductor motor, logic circuit components for operation as a step-servomotor, or the necessary inverter, etc., for brushless D.C. operation. The field coils 317 and 417 may have each a pair of leads, a center tapped arrangement may be used with three leads, or isolated split coils may be provided with four leads each, depending upon the requirements of the associated circuitry.

The rotor poles of the motor may be arranged either in line with both north poles on one side of the shaft or at 90° or 180° from each other. When the rotor poles are in line or at 180° the poles of one stator portion will be angularly spaced 90° from those of the other portion. On the other hand, with rotor poles at 90° the stator poles of both portions will be in line.

Figure 14:
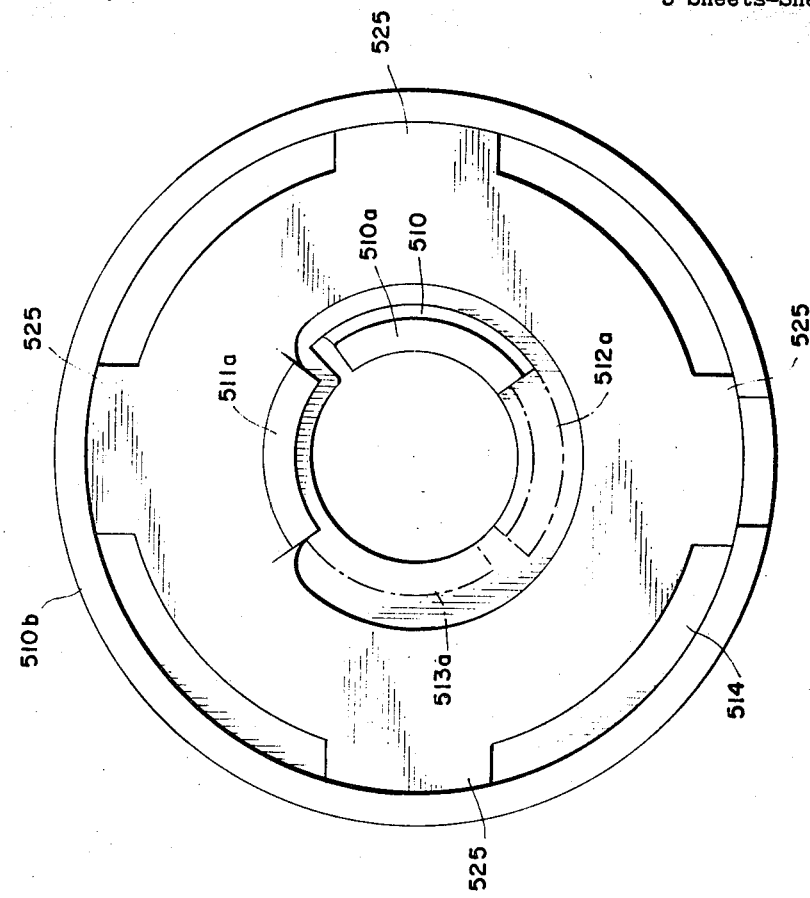
FIGURE 14 is an internal plan view of portions of the stator for the motor of FIGURE 13, with cooperating portions shown by broken lines.
Figure 13:
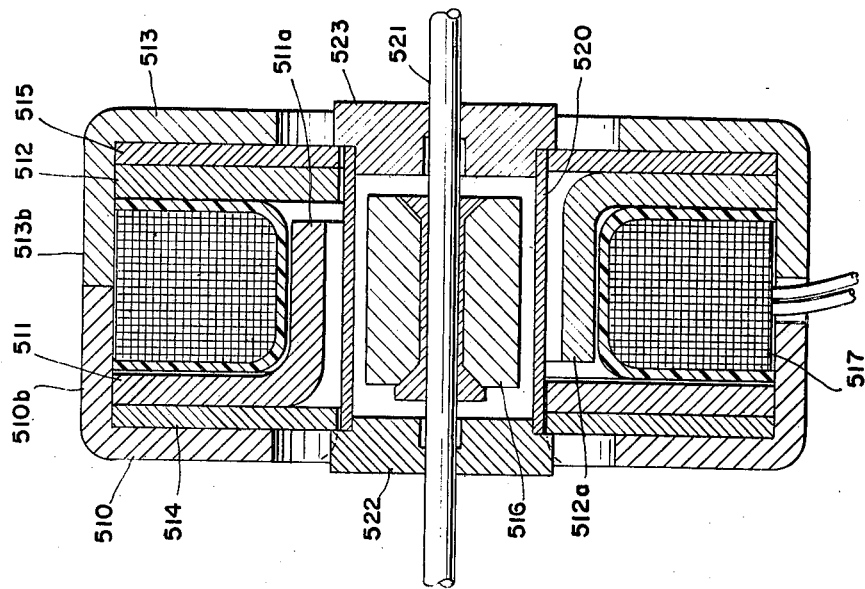
FIGURE 13 is a sectional view similar to FIGURES 2 and 5 but showing still another motor embodying this invention.

Referring to FIGURES 13 and 14, there is shown a particularly advantageous embodiment comprising a motor having stator discs 510, 511, 512 and 513. The discs are stacked in pairs, each pair being fitted to the other. Shading rings 514 and 515 fit respectively between the discs 510–511 and 512–513. The stator poles 510a and 511a (FIGURE 14) project from the central orifices of their respective discs 510 and 511 and are interfitted to form one sector of the pole piece array, while the stator poles 512a and 513a similarly project from their respective discs 512 and 513 and are interfitted to form the other and opposite sector. The motor also includes a rotor 516 positioned within the assembled stator poles and a field coil 517 which is externally disposed with respect to the poles. The rotor 516 is mounted on a shaft 521 supported by two circular bearing members 522 and 523 adjacent the outer pole pieces 510 and 513, respectively. These bearings are interconnected by a sleeve 520 to form a housing for the rotor.

The shaded outer pole pieces 510 and 513 are of cup-shaped configuration and are provided with respective flanges 510b and 513b. These flanges are in contact with each other and function as the cover for the motor. The unshaded inner pole pieces 511 and 512, on the other hand, are flat and are of a diameter somewhat less than the inside diameter of the flanges 510b and 513b throughout the major portion of their periphery. Each of the pole pieces 511 and 512 includes four equally spaced extensions 525 which contact the flanges 510b and 513b. The extensions 525 serve to carry the magnetic return path for the unshaded poles through the cover of the motor. Because of the spaces between the extensions, the magnetic reluctance of the return path for the unshaded poles differs from that for the shaded poles, with the result that there is provided an extremely efficient flux relationship between the two sets of poles.

FIGURES 16–19 are illustrative of an A.C. motor in accordance with a further advantageous embodiment of the invention. The motor includes stator pole pieces 610, 611, 612 and 613 which in some respects are similar to the various pole pieces described heretofore but are wedge or pie shaped rather than circular in configuration. As best shown in FIGURE 16, the pole pieces 610 and 613 each form a 90° angle and are provided with shaded poles 610a and 613a which extend in an axial direction at right angles to the main body portions of the pole pieces. The pole pieces 612 and 613 describe 75° angles and include unshaded poles 612a and 613a which are similarly disposed with respect to the main body portions of the pole pieces but are spaced slightly farther away from the axis of the motor to form a nonuniform air gap.

Two aluminum shading rings 614 and 615 are respectively positioned intermediate the pole pieces 610–611 and 612–613. As best shown by the illustration of the shading ring 614 in FIGURES 17 and 18, each of the shading rings includes a diametric step 626 and eight extruded projections 627. Four of these projections protrude from one face of each ring on one side of the step, while the remaining four projections protrude from the other face on the other side of the step. The projections extend from the corresponding face by a distance equal to the thickness of the step and cooperate with corresponding locating holes 630 (FIGURE 19) in the main body portions of the pole pieces 610, 611, 612 and 613. Each of the shading rings is provided with a central orifice 631 which is notched, as at 632, to accommodate the corresponding shaded pole 610a or 613a.

The rotor assembly of the motor is generally similar to that for the motor of FIGURES 13 and 14 and comprises a narrow two-pole rotor 616, a rotor shaft 621 and two end bearings 622 and 623 interconnected by a sleeve 620. The bearing 622 is mounted in a suitable aperture in a pear-shaped gear box 620 for the motor, while the bearing 623 is supported in the opening 631 of the shading ring 615 adjacent the ferro-magnetic cover 628.

With the rotor assembly in place on the gear box 620, the stator structure may be assembled by first inserting two of the projections 627 on the shading ring 614 into the mating holes 630 on the shaded pole piece 610 and then placing these components on the gear box. The pole piece 610 and one half of the shading ring 614 rest on the gear box, while the other half of the shading ring is spaced from the gear box by the pole pieces and the remaining two projections 627 thereon. The unshaded pole piece 611 is then located on two of the projections on the first half of the shading ring 614 in accordance with the angular orientation shown in FIGURE 16. The field coil 617 is inserted around the assembled stator poles 610a and 611a of the pole pieces and is spaced from the first half of the shading ring 614 by the pole piece 611 and the remaining projections 627. The unshaded pole piece 612, the shading ring 615 and the shaded pole piece 613 may then be successively added to the assembly in a similar manner. The cover 628 is positioned around the assembled pole pieces and shading rings and is suitably affixed to the gear box 620 such that both the cover and the gear box form part of the magnetic return path for the motor.

It will be noted that the foregoing arrangement provides a pie-shaped space 640 between the shading ring 615 and the cover 628. A similar space (not visible in the drawings) is provided between the shading ring 614 and the gear box. For bearing lubrication purposes, a generally triangular felt wick may be inserted in one or more of these spaces and may be provided with suitable holes for the corresponding projections 627.

Each of the motors in accordance with the various illustrated embodiments of the invention is of round configuration and includes an elongated rotor having but a single pair of nonsalient poles. The motors also include only two unshaded salient stator poles and two shaded salient stator poles. The motors exhibit high torque and cool running characteristics and are readily sealable in compact units.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. An electric machine comprising a multipart centrally orificed stator, a slim rotor within the stator orifice and having a pair of magnetic rotor poles, the stator including opposite pole pieces each having only a single stator pole projecting perpendicularly from adjacent the margin of the stator orifice, half of the pole pieces being stacked with their stator poles projecting in opposite directions and respectively diametrically opposed to form a cylindrical array encompassing the rotor and radially spaced therefrom, and means for securing the stator parts together.

2. An electric motor comprising a toroidal stator assembly, a permanent magnet rotor having a greater length than diameter within the stator, the stator comprising like halves including orificed disc members having salient poles projecting perpendicularly from the rims of their orifices, the disc members being interfitted to define a part of the stator including an arcuate array of salient poles disposed around the rotor in spaced relationship therewith, one of the salient poles in each stator half being closer to the rotor than other poles to define a nonuniform air gap between the rotor and the stator, and means for holding the disc members together.

3. An electric machine comprising a toroidal stator, a field coil surrounding said stator, and a permanently magnetized slim cylindrical rotor mounted in the stator, the rotor having opposite poles within its peripheral surface, the stator comprising mating portions intermeshed to form a substantially cylindrical orifice for the rotor and a support for the field coil, each stator portion comprising a centrally orificed disc having a salient pole perpendicular thereto at the orifice periphery, each disc having an interrupted upstanding flange projecting in parallel with its pole, the parts of each flange interfitting with parts of another flange to define a housing for the stator.

4. An electric machine comprising a magnetizable stator having a cylindrical orifice therein, magnetizing means for the stator, a sectionally magnetized cylindrical rotor having at least one pair of magnetic rotor poles therein, adjacent rotor poles being oppositely magnetized and the rotor mounted for rotation within the stator orifice, the stator having at least two pairs of opposite pole pieces each including a salient stator pole projecting perpendicularly from the margin of the stator orifice, and a conductive shading ring associated with one of the pole pieces in each pair, the pole pieces of each pair being stacked with their stator poles adjacent and projecting in the same direction, the pairs of pole pieces also being stacked with the stator poles of each pair projecting in opposite directions and respectively diametrically opposed to form a cylindrical array encompassing the rotor, the radial spacing from the rotor of adjacent pole pieces being different from each other but the same as that of the opposite pole pieces, the shading rings being associated with the pole pieces having the lesser spacing, and means for holding the pole pieces together.

5. An electric machine as in claim 4 in which each of said pole pieces comprises a centrally orificed, cylindrically flanged disc having a plurality of spaced legs forming the cylindrical flange thereof, the legs of the discs in each pole piece pair being interfitted and cooperating with the legs of the discs in the other pole piece pair to form a substantially continuous cylinder, alternate legs of the discs in each pair projecting axially beyond the intervening legs of the discs in the other pair to intermesh endwise therewith with the legs thereof.

6. An electric machine as in claim 4 in which the ratio of the length to the diameter of the rotor is at least about 1.25 to 1.

7. An electric machine as in claim 4 in which the rotor is of ceramic material that has high magnetic coercivity, low permeabilty and low specific gravity, the rotor having a greater axial length than diameter.

8. An electric machine as in claim 4 in which at least one of the shading rings has projecting portions extending outwardly beyond the main stator structure to serve as mounting means.

9. An electric machine as in claim 4 in which each of said pole pieces includes a cylindrical flange, and in which the means for holding the pole pieces together comprises a holding band adhesively secured to the flanges.

10. In an electric rotating machine, a two-pole rotor of elongated cylindrical configuration having a length to diameter ratio of at least about 1.25 to 1, and a cylindrical stator structure including a field coil mounted coaxially with the rotor, the stator structure of the machine including only a single pair of shaded stator poles and only a single pair of unshaded stator poles in magnetic flux relationship with the rotor, said rotor having a quiescent stopping position in which each of the shaded stator poles is directly opposite one of the rotor poles, to thereby provide the machine with a unidirectional self-starting characteristic upon energization of said field coil.

11. A motor assembly including a housed adjunct to be driven thereby, said assembly comprising an annular stator structure, a rotor and shaft therefor in coaxial relationship with the annular stator structure, a closed ended cylindrical projection of the adjunct housing encasing said rotor and in turn fitting within the annular stator structure, and a pair of spaced bearings for supporting the rotor shaft, at least one of said bearings being mounted within the adjunct housing.

12. A motor assembly as in claim 11 in which the other bearing is mounted within said cylindrical projection adjacent the closed end thereof.

13. An electric machine comprising a magnetizable stator having a central opening therein, magnetizing means for the stator, a rotor mounted for rotation within the stator opening, the stator comprising interfitting centrally orificed discs having only a single stator pole projecting perpendicularly from the margin of its central orifice, the discs being stacked with the stator poles projecting in opposite directions and respectively diametrically opposed to form an interrupted cylindrical array encompassing the rotor and radially spaced therefrom, and a mechanical one-way rotation inhibitor cooperating with the rotor.

14. An electric machine comprising a two-portion magnetizable stator, each portion having a central orifice therein, magnetizing means for each stator portion, rotor means including two rotor sections each having at least one pair of magnetic rotor poles therein, adjacent rotor poles being oppositely magnetized, the rotor sections being mounted for rotation one within each stator orifice, each stator portion comprising opposite pole pieces each having a stator pole projecting perpendicularly from the margin of the stator orifice, the pole pieces of each stator portion being stacked with their stator poles projecting in opposite directions toward each other and respectively diametrically opposed to form an interrupted cylindrical array encompassing the corresponding rotor section and radially spaced therefrom, the rotor sections being mounted on the same shaft with their poles arranged such that the flux flow through each section is respectively different at any instant.

15. An electric machine comprising a two-portion magnetizable stator, each portion having a cylindrical orifice therein, magnetizing means for each stator portion, rotor means including two rotor sections each having at least one pair of magnetic rotor poles therein, adjacent rotor poles being oppositely magnetized, the rotor sections being mounted for rotation one within each stator orifice, each stator portion comprising opposite pole pieces each having a stator pole projecting perpendicularly from the margin of the stator orifice, the pole pieces of each stator portion being stacked with their stator poles projecting in opposite directions toward each other and respectively diametrically opposed to form an interrupted cylindrical array encompassing the corresponding rotor section and radially spaced therefrom, the rotor sections being mounted on the same shaft with their poles being 90° apart and arranged such that the flux flow through each section is respectively different at any instant, the stator poles of the two stator portions being in line.

16. An electric rotating machine comprising a two-pole rotor of cylindrical configuration and a cylindrical stator structure including a field coil mounted coaxially with the rotor, the stator structure comprising opposed pairs of generally flat pole pieces each having a stator pole projecting perpendicularly therefrom in magnetic circuit relationship with said field coil, the pole pieces of each pair being stacked with the stator poles of the respective pairs extending in opposite directions toward each other, to form an interrupted cylindrical array of stator poles encompassing the rotor and radially spaced therefrom, a shading member interposed between the pole pieces in each pair for shading one of the stator poles therein, and means for modifying the reluctance of the magnetic circuit for the unshaded stator poles to produce a difference in reluctance between the circuits for the shaded stator poles and the unshaded stator poles.

17. An electric rotating machine as in claim 16 in which the pole pieces for said shaded stator poles are of cup-shaped configuration and the pole pieces for said unshaded stator poles comprise flat discs respectively disposed within the cup-shaped pole pieces, the reluctance modifying means including spaced-apart radial extensions on said discs.

18. An electric rotating machine comprising a two-pole rotor of cylindrical configuration, and a cylindrical stator structure including a field coil mounted coaxially with the rotor, the stator structure comprising opposed pairs of generally pie-shaped pole pieces each having a stator pole projecting perpendicularly therefrom in magnetic circuit relationship with said field coil, the pole pieces of each pair being stacked with the stator poles of the respective pairs extending in opposite directions toward each other, to form an interrupted cylindrical array of stator poles encompassing the rotor and radially spaced therefrom, and means for shading one of the stator poles in each pair of pole pieces.

19. An electric rotating machine as in claim 18 in which the shading means comprises an annular shading ring interposed between the pole pieces in each pair.

20. An electric rotating machine as in claim 18 in which the shading means comprises a generally flat shading member interposed between the pole pieces in each pair, each of said shading members having a step to accommodate the corresponding pole pieces.

21. An electric machine comprising a magnetizable stator having a central orifice therein, magnetizing means for the stator, a rotor mounted for rotation within the stator orifice, the stator including not more than two pairs of opposed pole pieces each including a salient stator pole projecting perpendicularly from the margin of said stator orifice, the pole pieces of each pair being stacked with their stator poles projecting in the same direction and the pairs of pole pieces also being stacked with the stator poles of each pair projecting in opposite directions to form a cylindrical array encompassing the rotor, a conductive shading ring associated with one of the stator poles in each pair of pole pieces, said stator including only a single pair of shaded stator poles and only a single pair of unshaded stator poles in magnetic flux relationship with the rotor, and means for holding the pairs of pole pieces together.

22. An electric machine as in claim 21 in which the shaded stator pole in each of said pairs is in abutting relationship with the unshaded stator pole in the opposite pair.

23. An electric machine as in claim 22 in which the two stator poles in each of said pairs are spaced from each other.

References Cited

UNITED STATES PATENTS

| | | | |
|---|---|---|---|
| 2,292,265 | 8/1942 | Carpenter | 310—164 |
| 2,766,863 | 10/1956 | Berg | 310—41 |
| 2,951,957 | 9/1960 | Eigeman | 310—164 |
| 2,981,855 | 4/1961 | Lieshout | 310—156 |
| 3,014,141 | 12/1961 | Riggs | 310—156 |
| 3,027,469 | 3/1962 | Sidell | 310—41 |
| 3,164,735 | 1/1965 | Lichowsky | 310—156 |
| 3,268,751 | 8/1966 | Nebiolo | 310—156 |
| 3,390,289 | 6/1968 | Dijken | 310—156 |

FOREIGN PATENTS 837,089   10/1937   France.

ORIS L. RADER, Primary Examiner

ALFRED G. COLLINS, Assistant Examiner

U.S. Cl. X.R.

310—156